US009713243B2

(12) United States Patent
Gharib et al.

(10) Patent No.: US 9,713,243 B2
(45) Date of Patent: Jul. 18, 2017

(54) TOROIDAL PLASMA SYSTEMS

(71) Applicant: CALIFORNIA INSTITUTE OF TECHNOLOGY, Pasadena, CA (US)

(72) Inventors: Morteza Gharib, Altadena, CA (US); Francisco Pereira, Rome (IT); Sean A. Mendoza, Alhambra, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/929,192

(22) Filed: Oct. 30, 2015

(65) Prior Publication Data

US 2016/0128173 A1 May 5, 2016

Related U.S. Application Data

(60) Provisional application No. 62/073,946, filed on Oct. 31, 2014, provisional application No. 62/073,944, filed on Oct. 31, 2014, provisional application No. 62/073,919, filed on Oct. 31, 2014.

(51) Int. Cl.

*B23K 10/00* (2006.01)
*H05H 1/24* (2006.01)
*H01T 19/00* (2006.01)

(52) U.S. Cl.

CPC ............... *H05H 1/24* (2013.01); *H01T 19/00* (2013.01); *H05H 1/2475* (2013.01); *H05H 2001/2481* (2013.01)

(58) Field of Classification Search

CPC ............ H05H 1/24; H01T 19/00; H01T 19/02
USPC .......................... 219/121.36, 121.48, 121.59
See application file for complete search history.

(56) References Cited

U.S. PATENT DOCUMENTS

| | | | | |
|---|---|---|---|---|
| 5,436,424 | A | 7/1995 | Nakayama et al. | |
| 2010/0189924 | A1 | 7/2010 | D'Evelyn et al. | |
| 2012/0074592 | A1* | 3/2012 | Luan | H01L 25/16 257/777 |
| 2014/0199756 | A1 | 7/2014 | Ish-Yamini Tomer et al. | |
| 2014/0354154 | A1 | 12/2014 | Watson | |
| 2015/0126097 | A1 | 5/2015 | Li et al. | |
| 2015/0228505 | A1* | 8/2015 | Ottobon | H01L 23/3107 264/272.14 |
| 2015/0270791 | A1* | 9/2015 | Sutherland | H01L 41/45 310/300 |
| 2015/0279731 | A1* | 10/2015 | Li | H01L 21/76874 257/753 |
| 2016/0024849 | A1* | 1/2016 | Kocis | H05H 1/40 175/16 |

OTHER PUBLICATIONS

WO, PCT/US2015/058507 ISR and Written Opinion, Feb. 11, 2016.

* cited by examiner

*Primary Examiner* — Mark Paschall
(74) *Attorney, Agent, or Firm* — One LLP

(57) ABSTRACT

A toroidal plasma is generated without voltage input. It can be produced using a pressurized water jet directed at a non-conductive, dielectric plate. Systems and methods employing the setup are described in which energy is generated and optionally harvested in addition to corona light.

19 Claims, 14 Drawing Sheets

TOROIDAL PLASMA SYSTEMS

RELATED APPLICATIONS

This filing claims the benefit of and priority to U.S. Provisional Patent Application Nos. 62/073,919, 62/073,944, and 62/073,946, all filed Oct. 31, 2014, and all of which are incorporated by reference herein in their entireties and for all purposes.

FIELD

The embodiments described herein relate to corona generation and use, optionally in the fields of electrical power and/or Radio Frequency (RF) generation.

BACKGROUND

Atmospheric-pressure electric corona is a phenomenon observed when an existing high potential electric field between two electrodes causes ionization of gas media in the vicinity of the electrodes. Atmospheric-pressure electric corona, which usually appears as a Blue-Pink plasma cloud, is considered a precursor to gap discharge and Van De Graaff type sparks if the electrostatic potential is elevated over a certain threshold.

Electric Corona's are usually observed in defective electric circuits or high voltage electric lines as an unstable, elongated and luminescent plasma cloud. Coronal onset under atmospheric pressure requires potential fields on the order of 10 to 100 KV between two well-defined electric nodes. Thus, in the absence of imposed electric field and well-defined nodes atmospheric pressure corona generation is rare.

The phenomena known as Saint Elmo's Fire offers one example of an electric corona. It has been observed at the tip of ship masts under stormy sea conditions. In these conditions, an electric corona can be generated between a ship's mast tip, offering a first well-defined node and highly charged clouds which can function as a second node and which can create an estimated potential electric field in the range of millions of volts.

Under controlled conditions, the underlying matter of corona generation—in the form of a stable plasma state of material—has numerous uses. Plasmas find application in the fields of metallurgy, spraying and coating, cleaning, etching, metal cutting and welding, lighting, and others. The corona producing approaches described herein create plasma which may be used in many of these existing fields. More importantly, the approaches described herein open entirely new field-based opportunities for commercial applications and research.

SUMMARY

The devices and methods described herein can employ a high pressure water jet directed at or impacting a dielectric plate to create plasma and associated atmospheric pressure corona. Dielectrics in some applications are commonly known to be electrically insulating material that can be polarized by applying an electric field. Systems and methods employing these principles are described, in which energy is created in addition to corona light. Use of water jets in corona production offers a number of potential advantages.

One set of advantages derives from the ability to have no direct application of electrical energy for the plasma generation. While piezo-electric devices, such as those from TDK, Inc., can be powered with an input or applied electric potential of up to 15 kV and can produce a so-called "cold" atmospheric pressure plasma, these devices are entirely reliant on the applied electrical potential to create the desired effect. Accordingly, plasma generated from such devices is not suitable for energy generation applications which may tap the electrical potential of the plasma. One reason for this is the inherent inefficiency of any such electricity-to-plasma-to-electricity cycle or conversion. While electrical components may be employed in the subject systems, methods, and devices described herein, in other example embodiments, none are required.

Another set of advantages of water-jet produced corona devices and methods concerns the shape or form of the plasma formed. Namely, the subject water jet approach can form a toroid shaped plasma corona. This form-factor can be uniquely applied as described below in addition to other potential applications.

Moreover, plasma corona formed by the systems, methods and devices described herein is boundary-less. In some embodiments it may be generated at atmospheric pressure or in any range of pressure between 800 to 1100 milliard. It can also be produced using a range of gases. These gases may include mixtures (e.g., atmospheric air) or pure gasses (e.g., He, $N_2$, Ar, Ne, $O_2$). Under confinement, the pressure of the generated plasma can be reduced to a small fraction of normal atmospheric pressure and the water jet used may be able to produce a boundary-less corona. Furthermore, it is possible to use heavy water and other non-conductive dielectric liquids (e.g., oil) to generate similar plasma.

When produced without application of an electrical field, the subject plasma is called "cold" plasma. Yet, it contains ample free electrons.

Devices, systems and kits in which they are included (both assembled and unassembled), methods of use and methods of manufacture contemplated herein are all included within the scope of the present disclosure. Some aspects and advantages are described above with a more detailed discussion presented in connection with the figures below. Other systems, devices, methods, features and advantages of the subject matter described herein will be or will become apparent to one with skill in the art upon examination of the following figures and Detailed Description. It is intended that all such additional systems, devices, methods, features and advantages be included within this description, be within the scope of the subject matter described herein, and be protected as described by the accompanying claims. In no way should the features of the example embodiments be construed as limiting the appended claims, absent express recitation of those features in the claims.

BRIEF DESCRIPTION OF THE DRAWINGS

The details of the subject matter set forth herein, both as to its structure and operation, may become apparent by study of the accompanying figures, in which like reference numerals refer to like parts. The components in the figures are not necessarily to scale, emphasis instead being placed upon illustrating the principles of the subject matter disclosed herein. Moreover, all illustrations are intended to convey concepts, where relative sizes, shapes and other detailed attributes may be illustrated schematically rather than literally or precisely, as understood by those with skill in the art.

DETAILED DESCRIPTION

Various exemplary embodiments are described below. Reference is made to these examples in a non-limiting sense, as it should be noted that they are provided to illustrate more broadly applicable aspects of the devices, systems and methods. Various changes may be made to these embodiments and equivalents may be substituted without departing from the true spirit and scope of the various embodiments. In addition, many modifications may be made to adapt a particular situation, material, composition of matter, process, process act or step without departing from the objectives, spirit and scope of the present invention. All such modifications are intended to be within the scope of the claims made herein.

Before the present subject matter is described in detail, it is to be understood that this disclosure is not limited to the particular example embodiments described, as such may vary. It is also to be understood that the terminology used herein is for the purpose of describing particular example embodiments only, and is not intended to be limiting, since the scope of the present disclosure will be limited only as described by the limitations of the appended claims.

All features, elements, components, functions, and steps described with respect to the embodiments provided herein are intended to be freely combinable and substitutable with those from any other embodiment as would be understood by one of skill in the art to accomplish the objectives described herein. If a certain feature, element, component, function, or step is described with respect to only one embodiment, it should be understood that such feature, element, component, function, or step can be used with many or all other embodiments described herein unless explicitly stated otherwise or unless such usage would compromise functionality of the particular system or method for its intended purpose. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility that such combinations and substitutions will be readily recognized by those of ordinary skill in the art upon reading this description.

Jet-and-Plate System

Figure 1A:
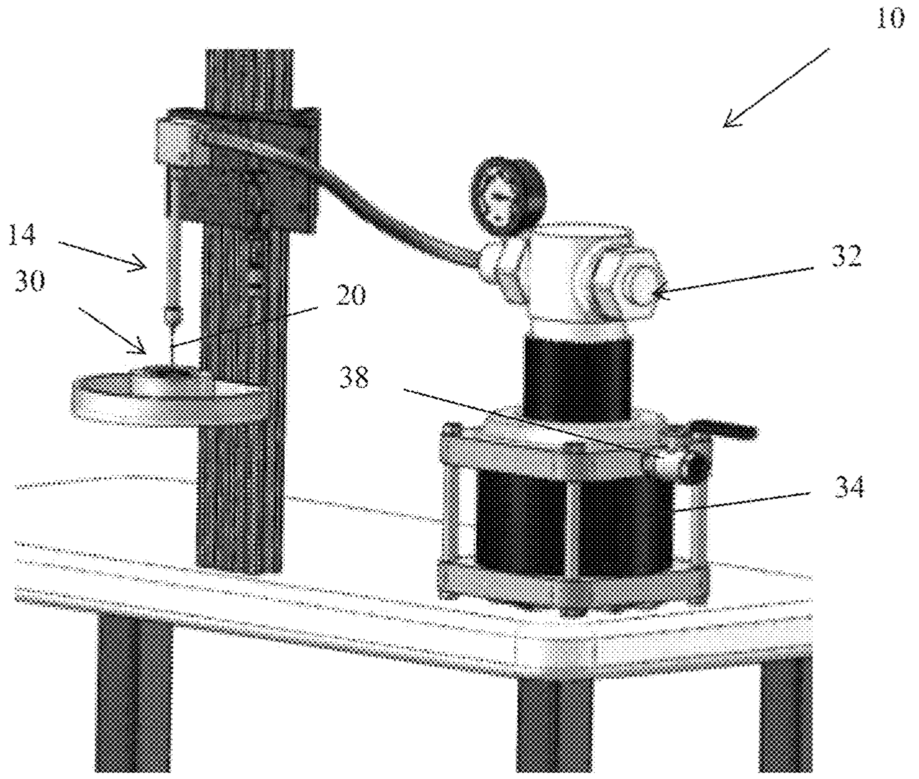
FIG. 1A is a perspective overview of an exemplary setup including jet-and-plate elements for corona generation.
Figure 1B:
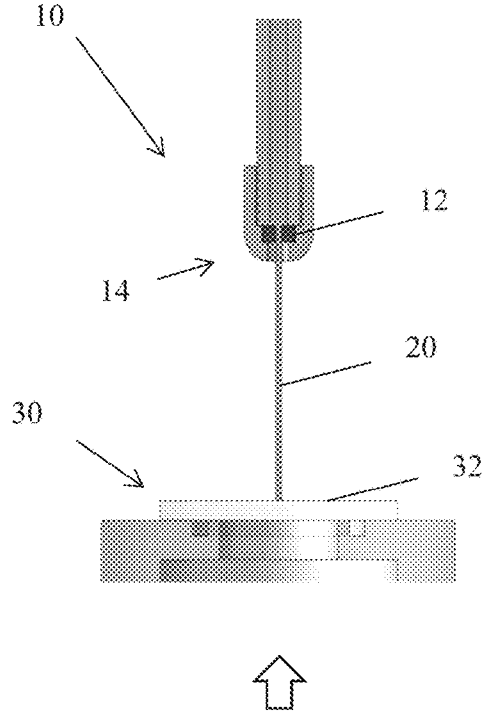
FIG. 1B is a side-sectional view of a jet-and-plate setup for corona generation.
Figure 1C:
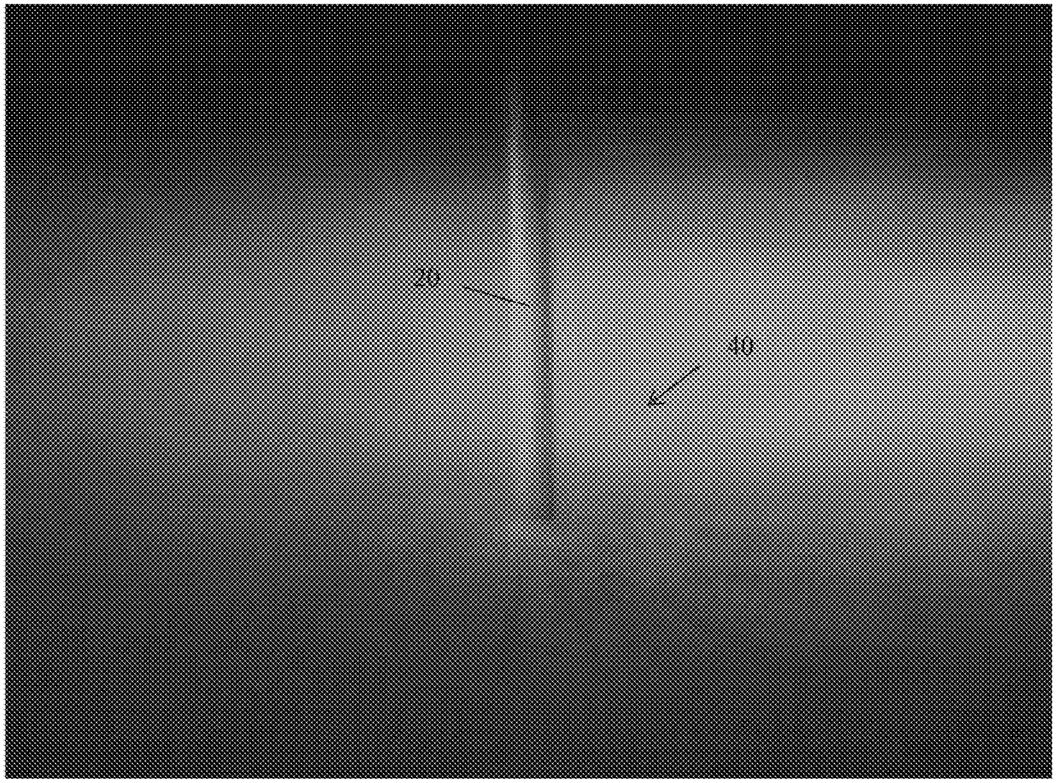
FIG. 1C is an oblique view digital image of an impingement region detailed in the setup in FIG. 1B illuminated by green light.

A self-excited micro-scale toroidal electric corona can be generated by the impinging a water jet of micron-size on many dielectric surfaces. An experiment with a setup 10, as shown in FIGS. 1A and 1B, was originally designed to investigate a near-surface flow field of an impinging micro-water-jet 20 on solid surface 30.

The setup 10 can include a commercial ruby nozzle 12 of 80 micrometer diameter fed with deionized water in a tank or reservoir 34 with a non-electric pump (powered by compressed air at fitting 38) capable of producing water jet speeds in the range of 1 to 430 meters per second. Ruby nozzle 12 was designed to deliver a disturbance-free laminar water-jet 20 in this speed range. The generated high-speed laminar jet 20 can maintains a disturbance-free character for 30 to 40 millimeters and subsequently break into a spray-type water-jet depending on the jet speed applied. Distance between a nozzle tip and impinging surfaces was maintained at 20 millimeters throughout some experiments, therefore avoiding spray-type formation before the jet impingement.

Water jets were formed with de-ionized or highly distilled and de-bubbled water with an ohmic resistance of about 18 MΩ-cm. FIG. 1B shows an impingement region 40 illuminated by green light. Even under laminar conditions, this jet was found to be capable of damaging common glass surfaces. To maintain intact glass surfaces, wafers or plates 32 made of either single crystal pure Quartz (Silicon Oxide-$SiO_2$), Sapphire (Aluminum oxide ($Al_2O_3$)) and single crystal Lithium Niobate ($LiNbO_3$) were employed in different embodiments.

Figure 2A:
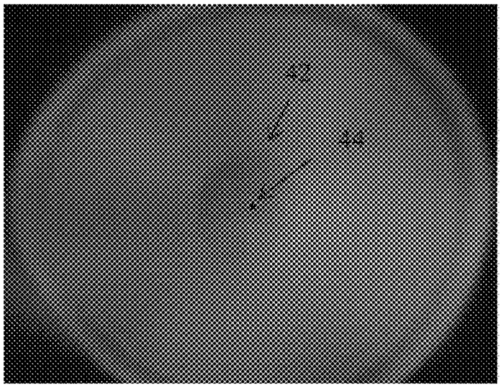
FIGS. 2A and 2B are (underside) plan views of the impingement region shown in FIG. 1B at different water jet velocities.
Figure 2B:
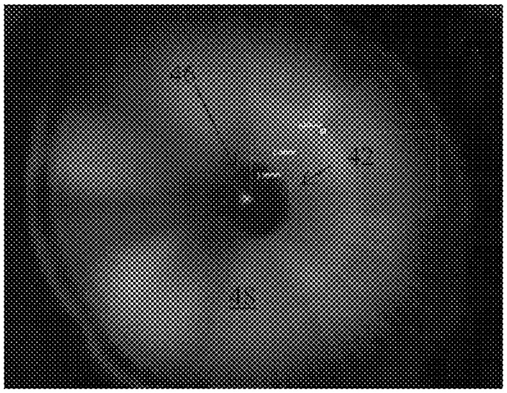

Under white light illumination, impacting jet 20 and a subsequent radial spreading of water from the water jet show the smooth surface and presence of a well-defined hydraulic jump 42 for jet speeds below 200 meters per second (m/s). This result is well expected from previous studies of thin water jet impingements. For some experimental setups, the core region 44 of an impinging jet appears as a black disk of about 80 micrometer similar to that of the impacting water-jet diameter, as shown in FIG. 2A. However, when water-jet speed was elevated to 200 m/s and above, a bright, luminescent pink-blue spot 46 appeared over this central black disk region, as shown in FIG. 2B.

Appearance of the luminescent region 48 can be concurrent with the appearance of surface capillary waves and resultant spray generation emanating from a circumference of circular hydraulic jump 42 as shown. Notably, the luminescence did not appear when normal water (i.e., tap water containing minerals causing low ohmic resistance) or conducting metallic wafers or plates 32 were used as opposed to non-conducting dielectric plates.

Figure 3:
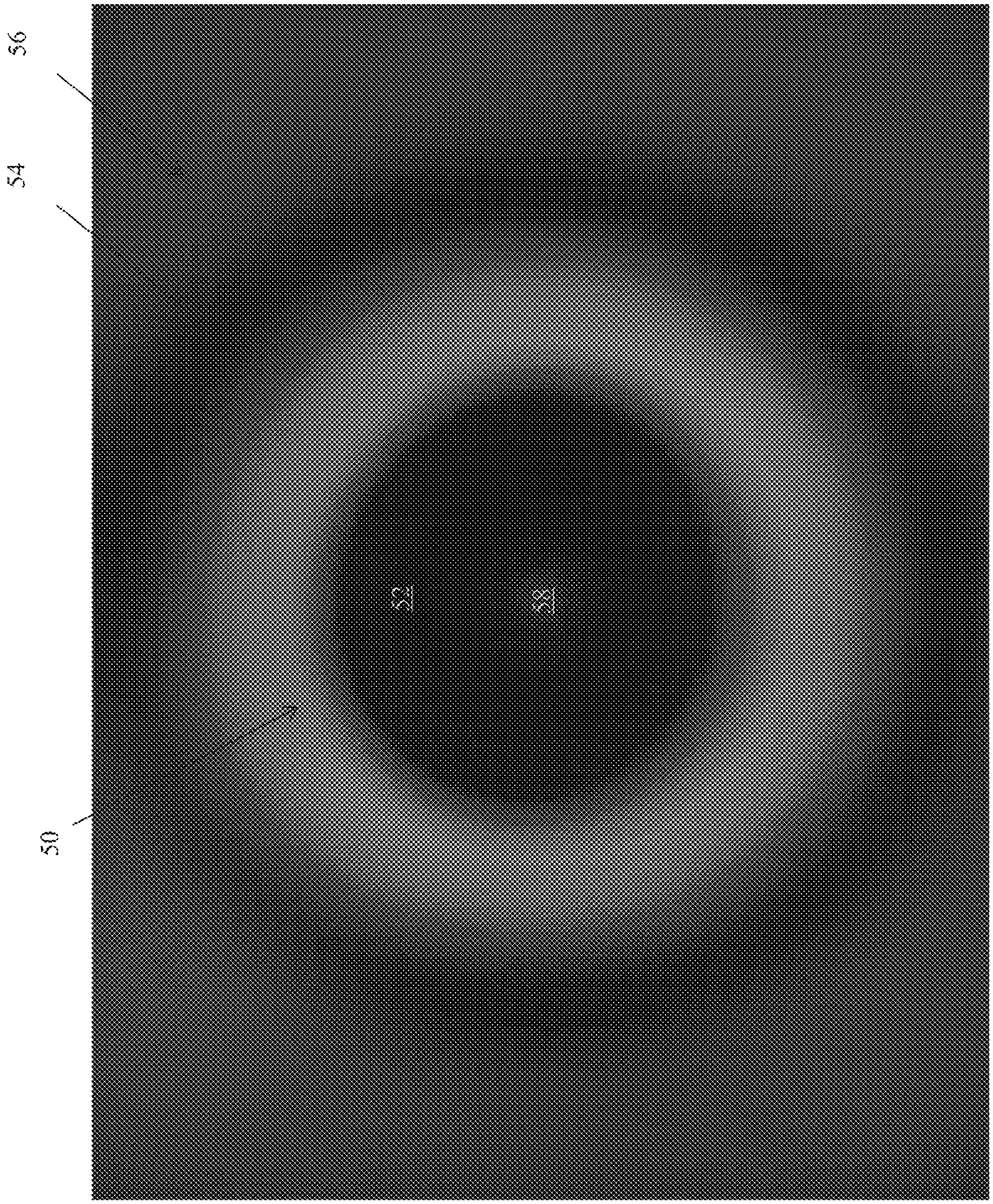
FIG. 3 is a time-exposure plan view digital image of an example embodiment of a corona luminescent region.

Some experimental setups allowed optical access through a circular opening under wafer 32 in the direction of the arrow in FIG. 1A. In particular, transparency of quartz wafers 32 allowed use of high-resolution microscopy to investigate internal structures of the luminescent region as well as spectral content of the light radiating from this region. FIG. 3 depicts a magnified time exposure (about 5 seconds) view of the luminescent region.

In this image, a rich structure including the presence of a toroid or donut-shaped luminescent region 50 outside the core area disk 52 followed by neighboring dark ring 54 and the presence of a surrounding third cloud-like glowing ring 56 can be observed. (Note that the central faint blue region 58 appears to be the reflection of the light from the first ring on the nozzle housing or tip 14.)

Through experiments, it was further discovered that while the threshold jet speed requirement for the onset of corona luminescence of approximately 200 m/s was required for a smooth quartz target plate, the jet speed could be significantly lower (e.g., about 150 m/s) for rougher surfaces to achieve a similar effect.

Figure 4:
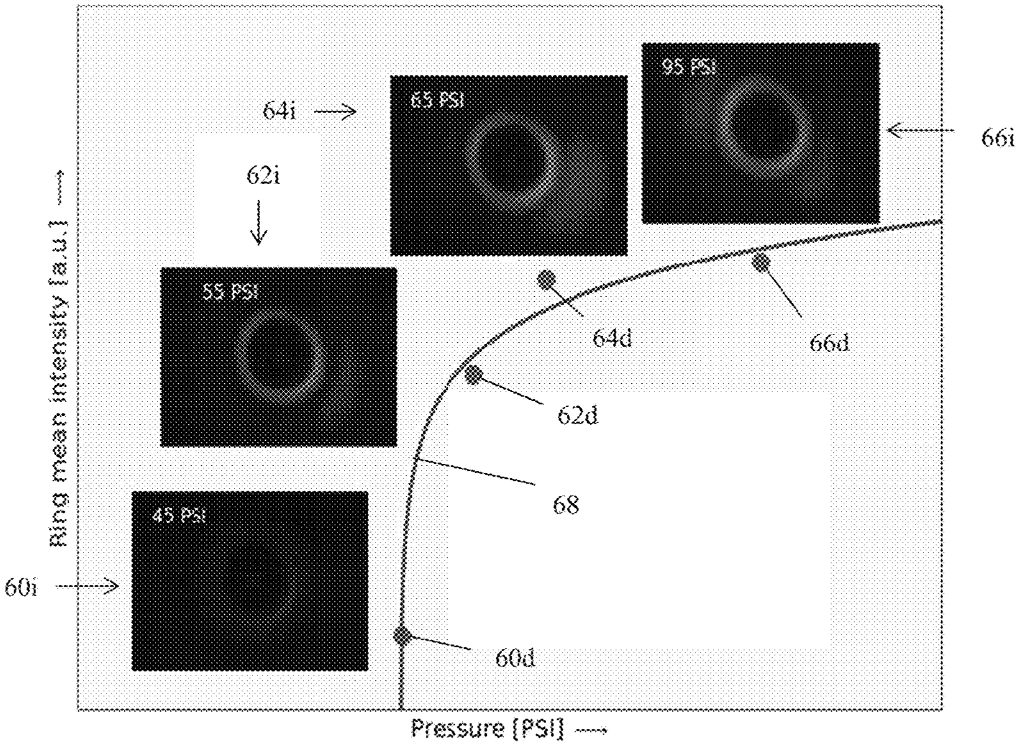
FIG. 4 is a composite chart variously illustrating the effect of increasing jet speed on corona production.

Also, a monotonic increase of glow intensity was observed with increasing jet speed as set forth in FIG. 4. This is seen in relation to the images 60*i*, 62*i*, 64*i*, 66*i* include correlated to jet increasing jet pressure (at 45, 55, 65 and 95 PSI) respectively. Accounted for as data points 60*d*, 62*d*, 64*d*, 66*d* plotted as ring mean intensity vs. pressure, they define curve 68.

Figure 5A:
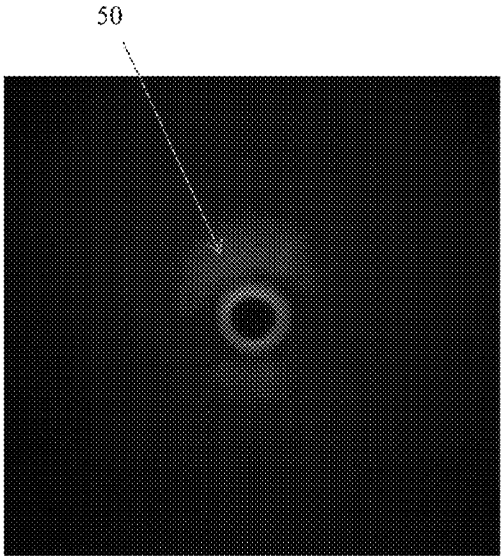
FIGS. 5A and 5B are similar to FIG. 3 and show a pair of similar images illustrating changes in color content of a generated corona pattern due to a change in gas media content between atmospheric air and Helium.
Figure 5B:
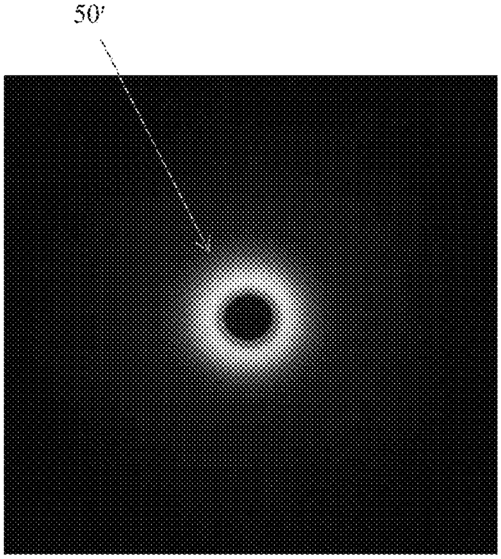

The source luminescence was shown to be in the gas phase (rather than residing in solid media) as is evident after review of FIGS. 5A and 5B. FIG. 5A shows corona 50 luminescence in atmospheric air; FIG. 5B shows corona 50' luminescence in Helium (He). Based on the change of color, the selected gas is responsible for the light emission.

Figure 6:
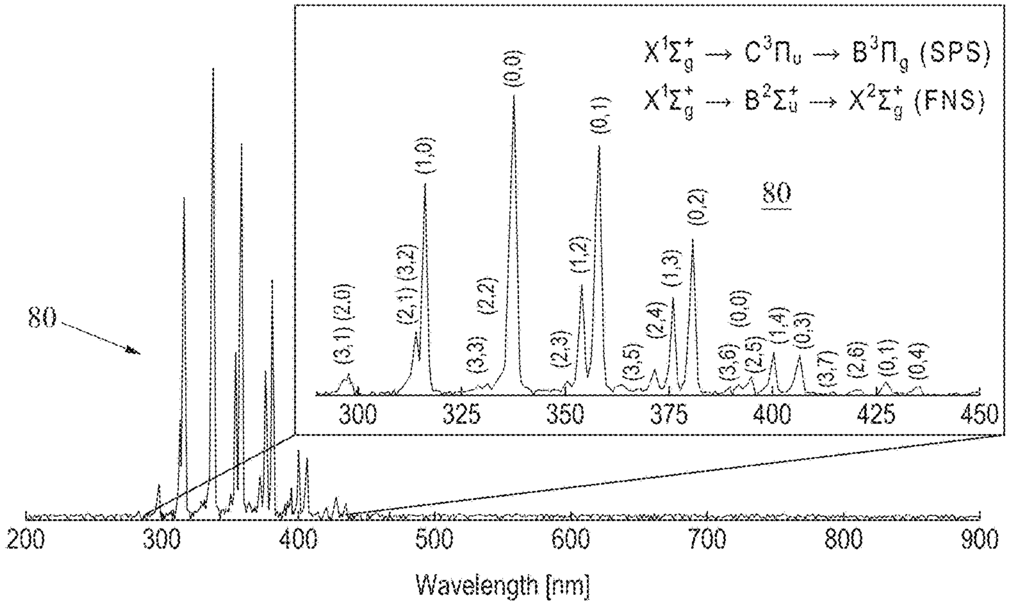
FIG. 6 is a chart illustrating spectral characteristics of a luminescent corona in air when a water-jet is applied to $SiO_2$ at an example 50 PSI.

In FIG. 6, a spectral chart of the characteristics of the luminescent region in air is presented. The spectral distribution 80 for atmospheric air is dominated by the bands of the second positive system (SPS) of molecular Nitrogen ($N_2$), as shown in the expanded inset plot. Likewise (though not shown), when the gas medium surrounding jet 20 and wafer or plate 32 was switched from air to helium, the dominant known spectral lines for helium appeared with corresponding yellow and red features in the appearance of the luminescent ring.

The striking feature of the emission spectra in a single gas medium is that the lines are from excited molecules, despite being in Argon, Helium, etc. As in the example of FIG. 6, no lines typical of singly or doubly ionized elements are observed. Also, no change in the nature of the spectral distribution was observed in changing the target surface from Quartz to Sapphire or Lithium Niobate, or from a smooth to a rough surface. These observations confirm that the source of the luminescence is due to the presence of highly excited, non-ionized, plasma gas in the toroidal corona cloud. Stated otherwise, the observation of spectral lines indicates the presence of a strong electric field in the vicinity of a free-surface of the impinging jet.

A dramatic change in the overall spatial appearance of the corona is observed when changing a target wafer or plate 32 from a relatively smooth to a relatively rough surface. Example surface roughnesses for selected plate materials are provided in the table below:

| Material | Roughness |
|---|---|
| Quartz | 813 nm or better |
| Lithium Niobate, normal cut | SP 10-15 Å 6-9<br>BP 6-9 μm or better |
| Lithium Niobate, y-cut | SP 10-15 Å<br>BP 6-9 μm or better |
| Lithium Niobate, x-cut | SP 10-15 Å<br>BP 6-9 μm or better |

Figures 7A, 7B, 7C:
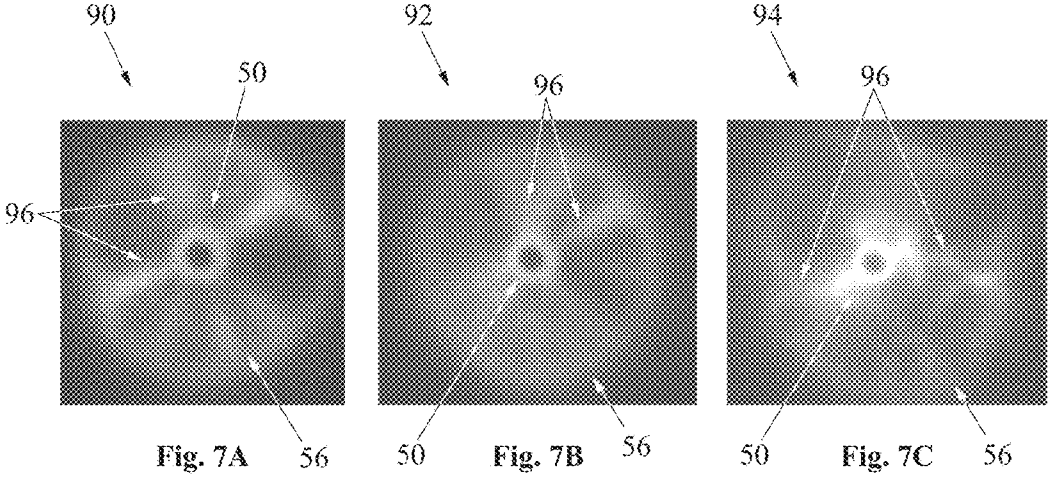
FIGS. 7A-7C are time-exposure plan view digital images illustrating the effects of target plate surface roughness on corona generation as a function of increasing jet speed (as correlated to jet pressure at 20, 40 and 70 psi, respectively).

FIGS. 7A-7C show examples of corona patterns 90, 92, and 94 on rough surfaces as a function of water-jet speed (i.e., corresponding to 20, 40 and 70 psi jet pressure, respectively) as compared to the smooth-surface based corona seen in FIG. 2B and further detailed in FIG. 3 via time-exposure.

Especially notable are the appearance of radial narrow band bridges 96 connecting the first and the second rings 50 and 56. Video images of these intriguing patterns reveal a highly dynamic nature that manifests itself in the form of strong mode switching and locking and a visual perception of rotation. One possible explanation for these observations is that the patterns may be a consequence of excitation of spatial hydrodynamic instability modes of a radially expanding water layer associated with the target plate surface roughness. Regardless of the cause, the apparent additional corona generation (with such results at lower jet speeds and pressures for rough surfaces as commented above) may increase power yield in the power generation Example discussed below.

It is important to appreciate that the toroidal corona is observed in the absence of an externally imposed electric field between usually well-defined nodes (i.e., anode and cathode). However, the observation of strong excited or ionized spectral lines points indicates the presence of a strong ionizing electric field near the free-surface of the impinging water-jet. To map the strength of this electric field, the region surrounding the toroidal corona was surveyed using the Langmuir two-probe technique.

Figure 8:
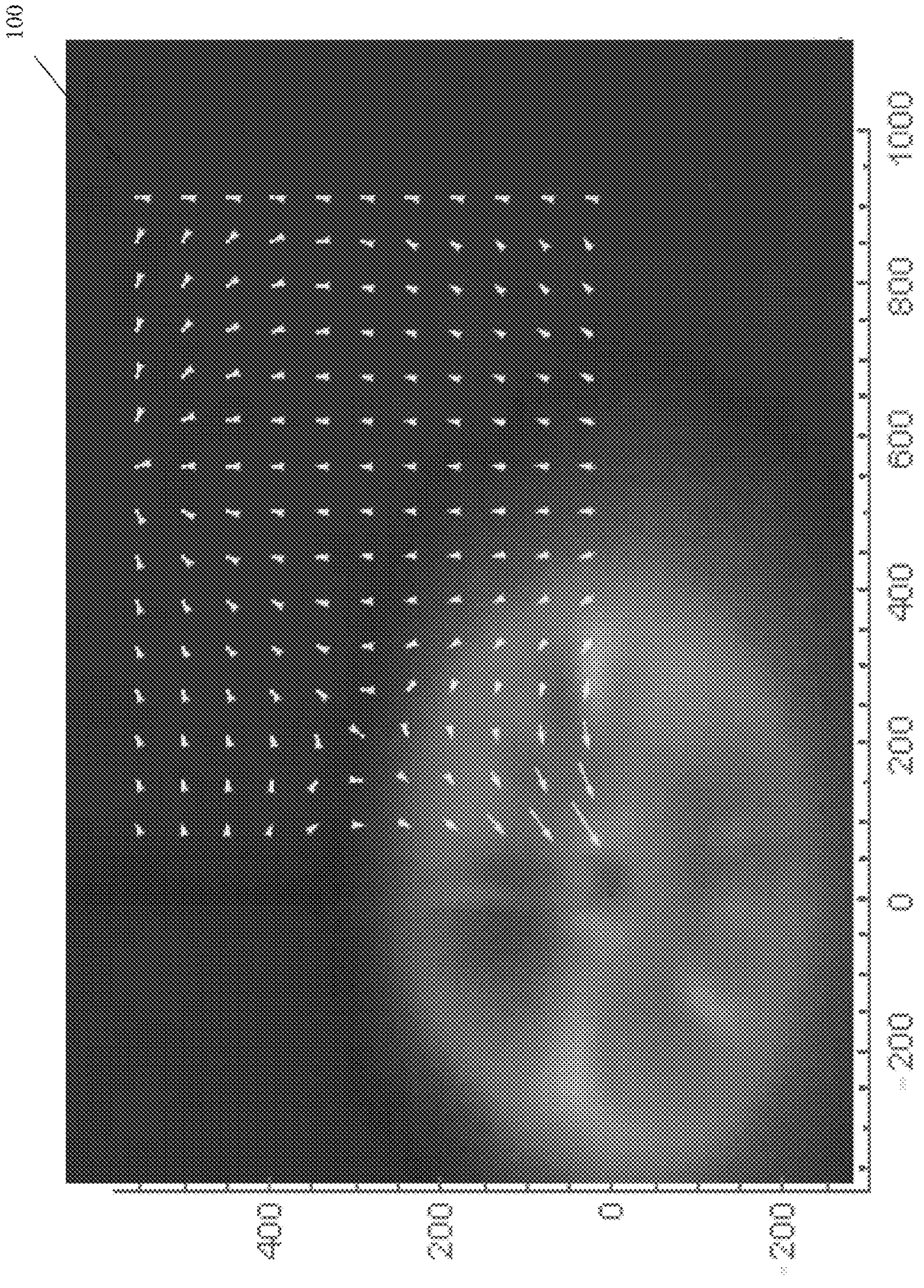
FIG. 8 is a chart that depicts electric field intensity around a generated corona in an example embodiment.

When the potential of a single probe, placed directly in the toroidal corona was compared to a ground value, the average voltage readings indicated a strong negative potential. This observation indicates an accrual of negatively charged particles in the toroidal corona region. The potential difference between this region and ground exhibited a great dynamic range from −300V to −1000V (the corona being at the lower potential). To map the extent and strength of the electric field of the corona, one probe was positioned 75 micrometers from the jet impingement annulus, while the second probe was moved radially away from the center at varying angles. Average 30 second voltages at each x-y coordinate provided enough data to generate a map of the electric field within a 3 mm radius. FIG. 8 depicts the electric field intensity in the close vicinity of the free-surface of the impinging jet weighted by distance, where the graph origin is located at the jet impingement center. Note that field vectors gain strength as they approach the neck of the jet where the impinging jet sharply turns to an expanding radial jet. The field vectors also indicate that negative charges (i.e., electrons) which move in the opposite direction of field vectors, should emanate from the neck region. This observation suggests that the annular neck or turning region acts as cathode. The field vectors near the free-surface in the radial distance range of 500 to 600 microns pointing upward suggesting the presence of an anode site in that radial band.

It is believed that one explanation for the mechanism responsible for generating the observed electric field should be closely related to the interaction of the impinging jet with the surface of the dielectric target. One candidate for the charge generating-mechanism is a process known as "streaming potential." Stream potential is due to voltages that can be produced by the triboelectric action of flowing liquid over solid surfaces.

Figure 9A:
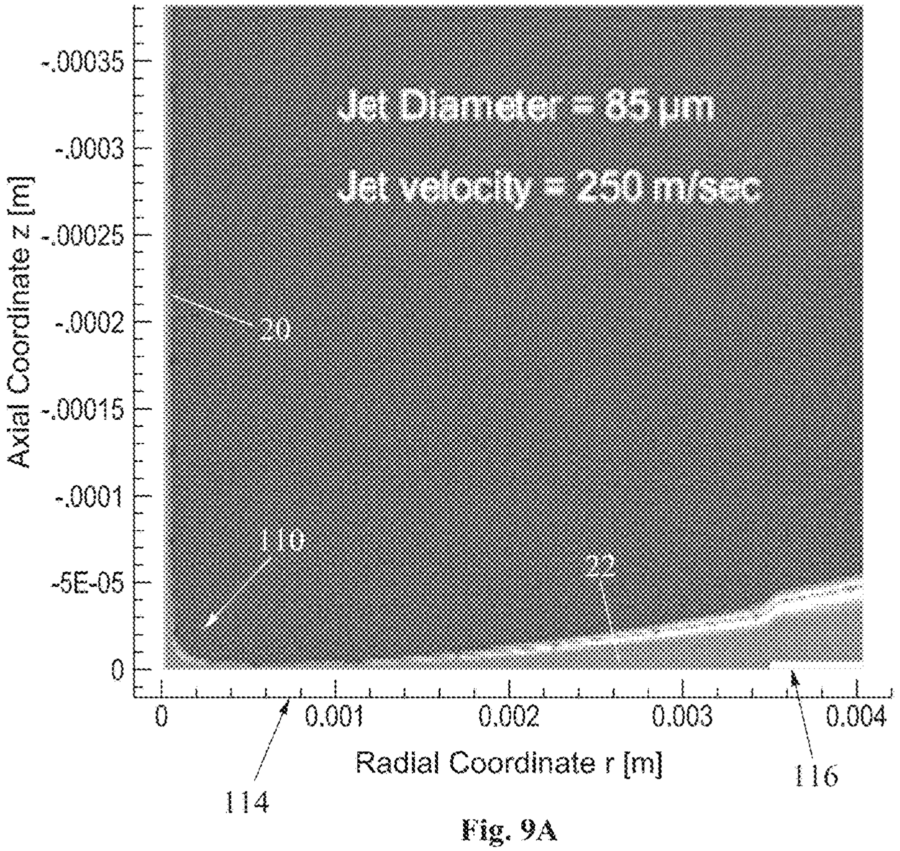
FIGS. 9A-9C are charts at different levels of magnification in which a boundary between liquid (red region) and gas phases (blue region) in an example system are mapped with respect to liquid velocity in FIGS. 8A and 8B and material strain rate in FIG. 8C.
Figure 9B:
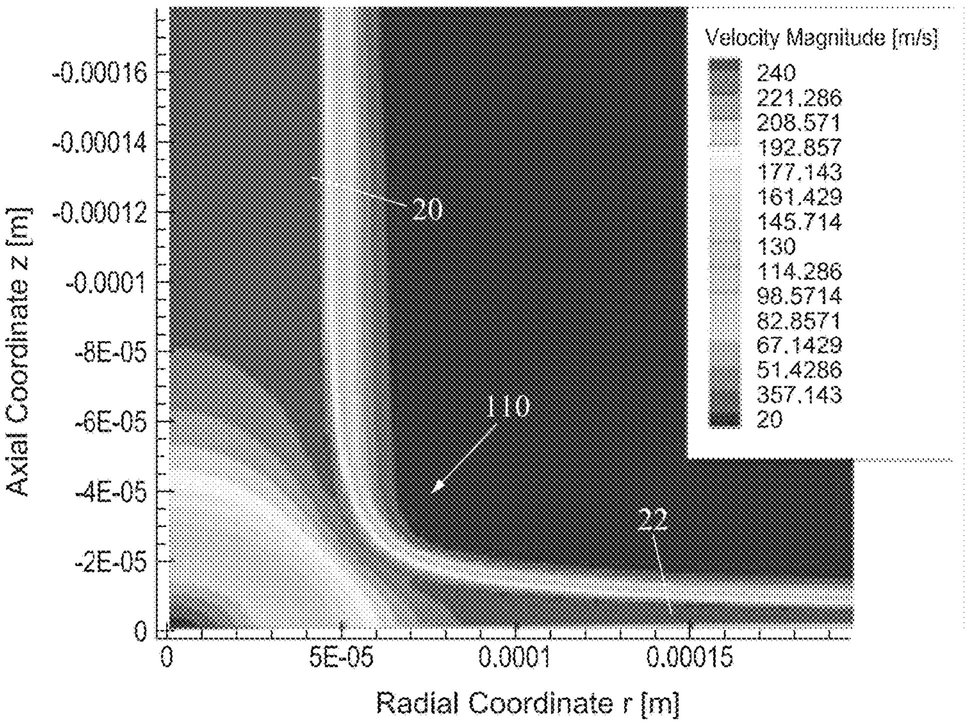
Figure 9C:
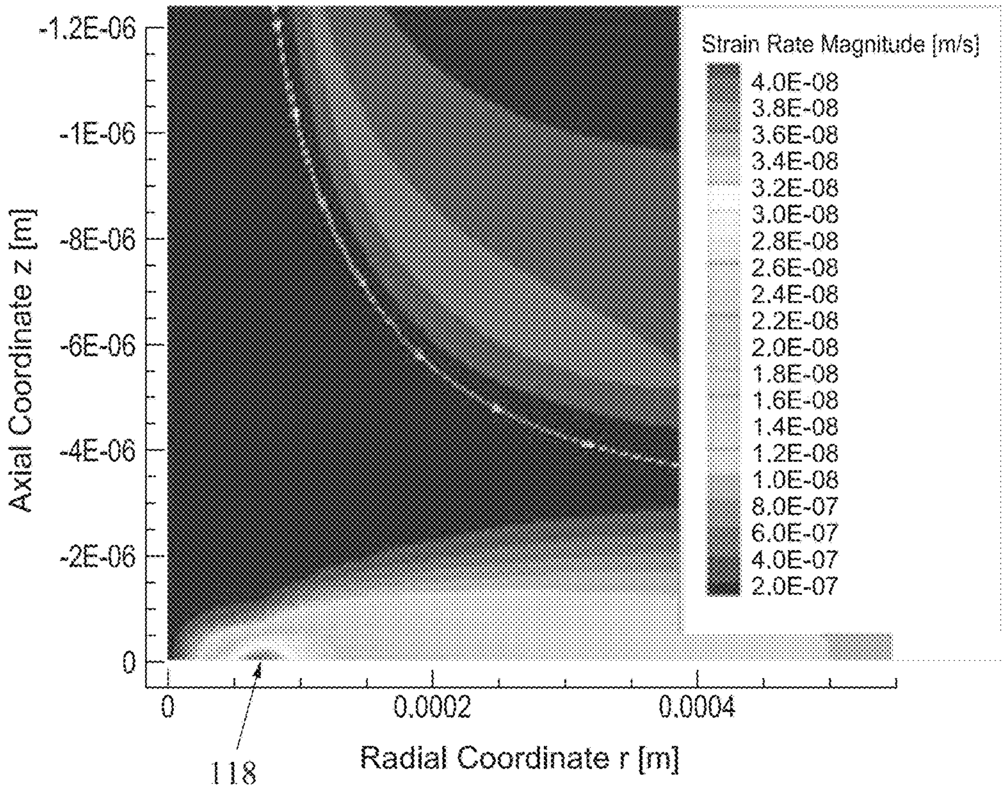

To explore this effect, numerical simulation of a flow field was performed. In FIGS. 9A-9C the boundary between liquid phases (i.e., red region) and gas phases (i.e., blue region) of system 10 were mapped. In FIGS. 9A and 9B, which both share the flow speed scale in FIG. 9B, a sharp turn 110 is observed where the round impinging jet 20 expands into a radial wall-jet 22. The radial wall-jet 22 goes through an extreme narrowing followed by a gradual thickening, both of which can be explained by the magnitude map of the velocity field. A rapid outward acceleration of flow from the stagnation region 112 is followed by a gradual deceleration, explaining respective thinning 114 and thickening 116 of the incompressible liquid wall-jet.

A resulting strain field is shown in FIG. 9C. A strong and highly concentrated shear region 118 is notable at the plate boundary or wall 32 about 70 micro-meter from the center of jet 20. The presence of such a highly frictional force suggests a triboelectric process may be generating electric charges.

The triboelectric process, also known as charge transfer process, occurs when two non-conducting materials come into contact with one another. The rate of electron transfer can depend on the refreshment rate of contacting surfaces, which can be in the form of periodic or continuous rubbing of these materials against each other. The triboelectric process for non-conducting fluids running over dielectric materials is well-known and has been studied and documented extensively. In some example embodiments herein, deionized water or other fluid can act as a non-conducting dielectric material when rubbing against sapphire, quartz, $LiNbO_3$ or other plate material that is both non-conducting and dielectric, (e.g., with a dielectric constant, Er, in the range from about 4 to about 12 for the plate material).

Figure 10A:
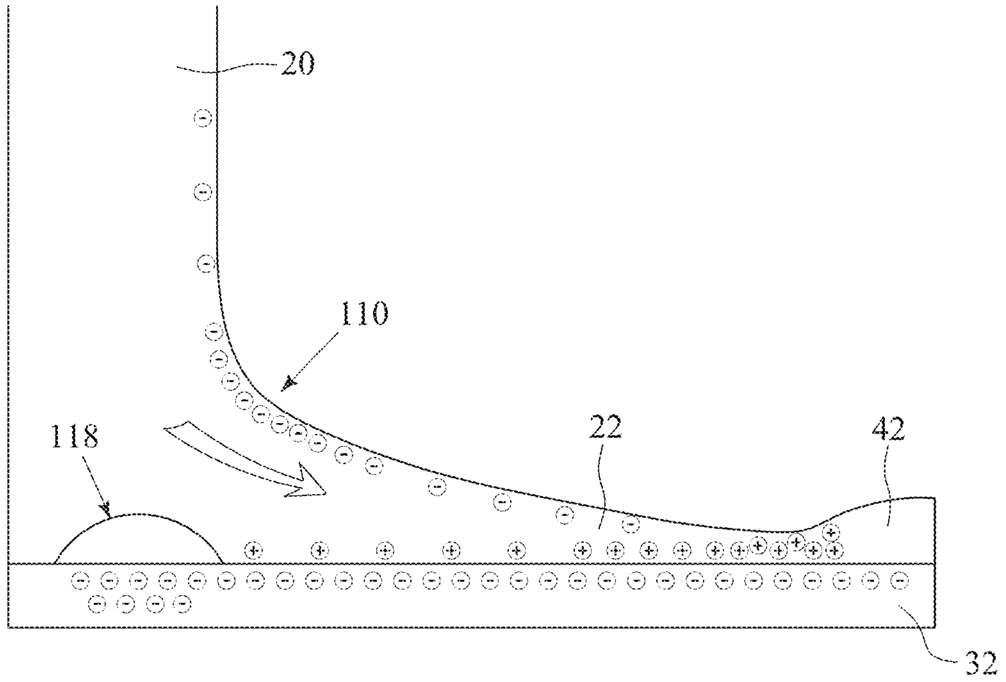
FIG. 10A is a side cross-sectional view diagram illustrating charge activity of a water jet and plate in an example embodiment.
Figure 10B:
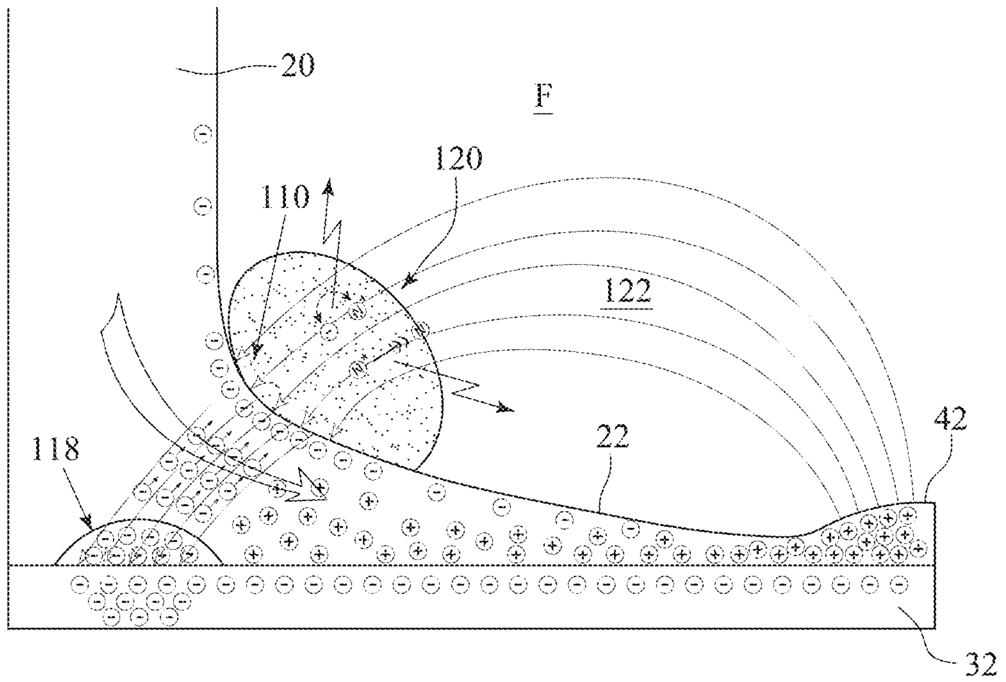
FIG. 10B is a side cross-sectional view diagram of showing corona generation in accordance with the example embodiment of FIG. 10A.

FIGS. 10A and 10B present a model based on the example embodiment above to depict the suspected mechanism for the generation of toroidal corona and related observations. First, consider the target plate or wafer 32 as it is contacted with fluid at the onset of jet flow initiation. For silicon-based wafers such as quartz, silica and silicate glass can acquire a negative surface charge density when in contact with low-ionic liquids due to the dissociation of terminal silanol groups, SiOH<=>SiO—+H+, with SiO— attached to glass. Therefore, deprotonation of the liquid surface near the glass is expected to be followed by the formation of a double layer of positive charges near the upper surface of the liquid. In addition, at low impinging jet velocities, the rubbing effect between the radial wall of de-ionized non-conducting liquid water from jet 22 and the surface of the dielectric non-conducting quartz wafer 32 initiates a triboelectric charge potential accumulation of electrons over the readily deprotonated surface region. A charge gradient on the quartz side should be more prominent over the high shear or strain region 118, as similarly depicted in FIG. 9C. Likewise, it is expected that the positive ionic charges of a double layer of positive charges on the upper surface of the liquid to be removed and transported by the fast streaming flow of region 114 (see FIG. 9A) towards the first hydraulic jump ring 42.

One possible explanation that positive charges accumulate in expanded hydraulic jump region 42 where the flow rate decelerates rapidly, causing a positive charge concentration strong enough for a thin liquid sheet to break up and depart the solid surface in the form of highly charged spray droplets 120. Therefore, the first ring-hydraulic jump could act as an anode in an electric corona process, even without the application of an external electric field. With the speed of an impinging jet raised to about 200 m/s in an example embodiment using a smooth plate, the charge potential may then gain enough strength to overcome a break-down voltage of non-conductive liquid water and reach the free-surface of the impinging jet. The shortest distance to the free-surface appears to be the neck region 110 where the impinging jet turns to spread radially. Also, the neck area with the smallest radius of curvature is an optimal geometry to act as the second node, also known as the cathode. Note associated electric field lines 122.

It is well-known that sharp points possess higher charge concentration due to the redistribution of surface charges by the Coulomb force field. Only about one kilovolt (kV) would be required for a break-down of deionized water for a 10 micron distance between a high shear region and a neck area of a toroid since the break-down voltage of dionized water is known to be about 100M/V or 100V/micron.

In the example embodiment shown in FIG. 10B, some of the freed electrons are expected to collide with a number of water molecules in their passage to a free-surface side "F". This collision should knock-out some electrons from the most external 1B1 orbitals of water molecules. As a result, a drop in the pH of the water that arrived at the hydraulic jump should be observed. In fact, a pH of de-ionized water changed from 5.6 to 5.3 was detected, accounting for roughly a doubling H+ concentration.

Figure 11:
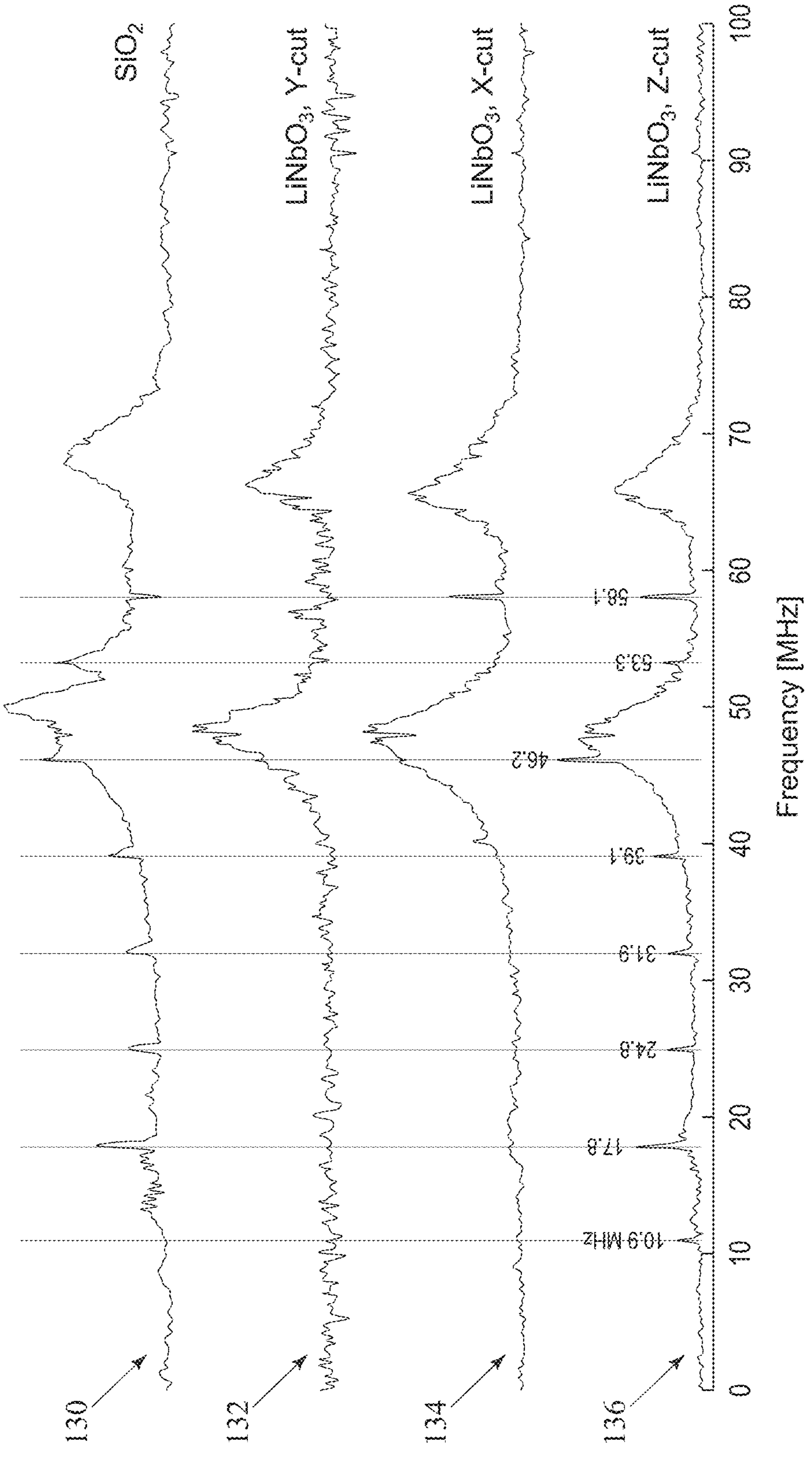
FIG. 11 is a plot of RF power generation of a system without application of a magnetic field, according to an example embodiment.

Another observation for system 10 involves the detection of RF emissions. Namely, in FIG. 11 spectra based on radio-frequency measurements performed using the RF antenna are shown. Plots 130, 132, 134 and 136 show the power in dBm (rel 1 mW) of an RF signal produced by the jet impinged on $SiO_2$ and Lithium Niobate with three different cuts (X, Y and Z), respectively. The spectra appear to be continuous, with two broad lobes centered around 48 and 66 MHz. However, the spectrum relative to Z-cut $LiNbO_3$ and $SiO_2$ exhibit also some discrete content in the range from 10 to 60 MHz. The peaks have a frequency spacing of 7 MHz, but for the peak at 58.1 MHz.

For $LiNbO_3$, it is notable that in contrast to the Z-cut variant, the X-cut is neither polar nor piezoelectric, while the Y-cut is nonpolar but has piezoelectric properties. This raises interesting questions regarding the possibility of coupling between the jet hydrodynamic instabilities and the material, specifically through its vibrational characteristics being able to create additional RF signal that may be put to use. One such application may be RF generation unaffected or immune to EM radiation since no electrical circuit is involved.

It is also notable that plasmas are known to oscillate in the form of Langmuir waves. These plasma oscillations are caused by density disturbances in the electron charge density caused by their interaction with the positively charged and much heavier ions. This induces electrostatic Coulomb forces that tend to restore the electron density equilibrium of the plasma. However, because electrons have a mass, the plasma starts to oscillate at a frequency that is related to the square-root of the electron density. Thus, by reversing this relation and using the RF peak values above, we find electron densities between about $1.5\times10^6$ and about $45\times10^6$ $cm^{-3}$ in the subject plasmas. These values are comparable with the electron densities found in negative coronas.

Figure 12A:
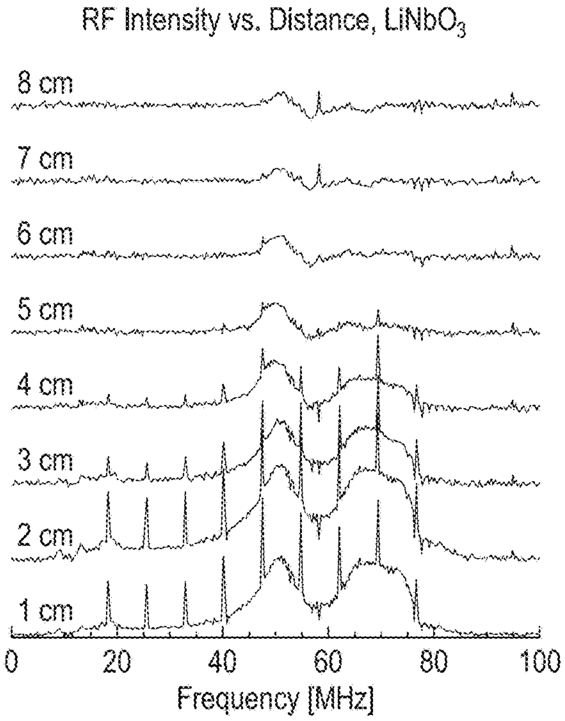
FIGS. 12A and 12B show a further characterization of RF power generation for a $LiNbO_3$ target dielectric, in accordance with the example embodiment shown in FIG. 11.
Figure 12B:
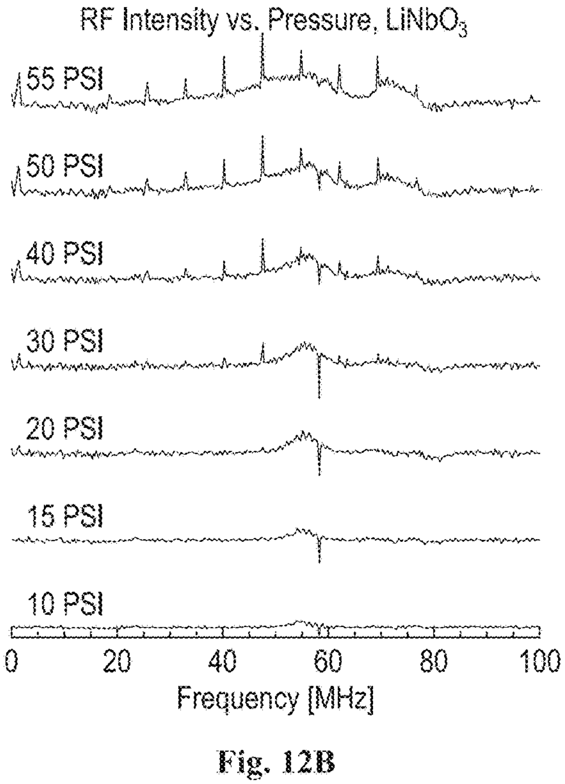
Figure 13A:
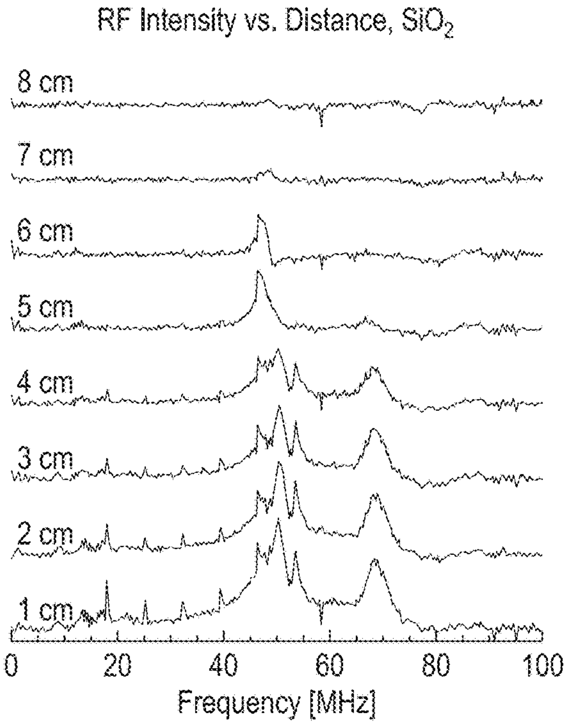
FIGS. 13A and 13B show a further characterization of RF power generation for a $SiO_2$ target dielectric, in accordance with the example embodiment shown in FIG. 11.
Figure 13B:
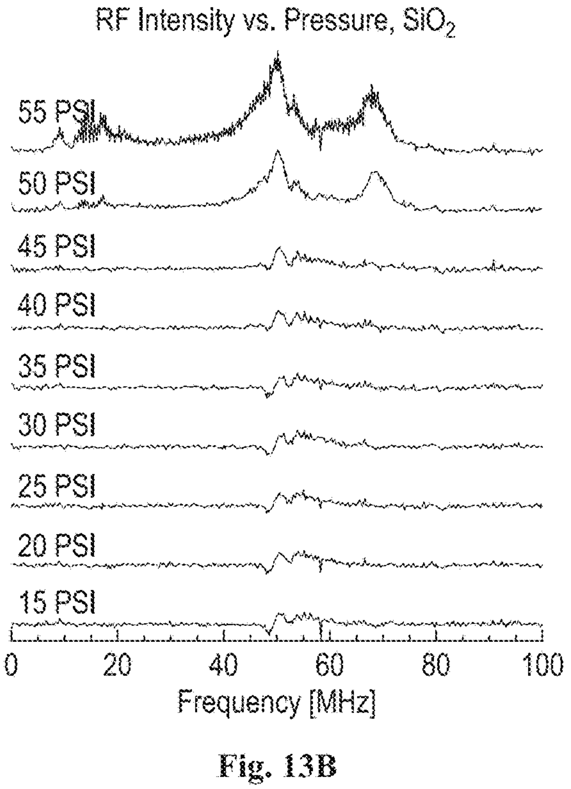

Further characterization of the RF energy and its production is presented in FIGS. 12A and 12B for a $LiNbO_3$ target, and 13A and 13B for a $SiO_2$ target. In each of FIGS. 12A and 13A, RF intensity appears to be correlated to distance from the system jet center. In FIGS. 12B and 13B RF intensity appears to be correlated to jet pressure and thus, corresponding to speed. Considering these variables, tailored field generation and application of generated fields is possible.

A multi-physics model is presented where, due to the tribo-electric effect, electrons are pumped continuously from a high-shear region to a neck region or cathode and respectively positive ions from a passage bridge to a hydraulic jump or anode. In example embodiments, the toroidal corona would reside between these two nodes as expected from the recorded and illustrated observations. Moreover, such a system—as understood and otherwise contemplated—can be adapted to function in a number of ways, non-limiting examples of which are provided below.

Examples

Figure 14A:
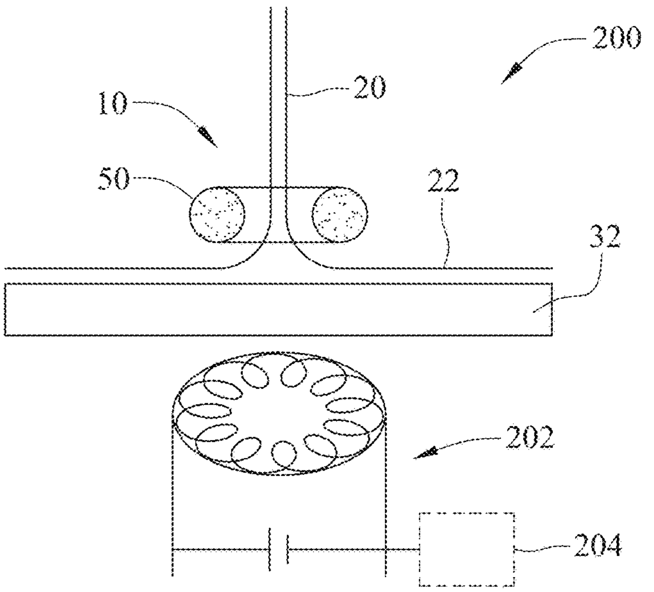
FIG. 14A is a side-view diagram of a toroidal RF generator, accelerator, or combination of both employing a jet-and-plate setup with a magnetic field according to an example embodiment.
Figure 14B:
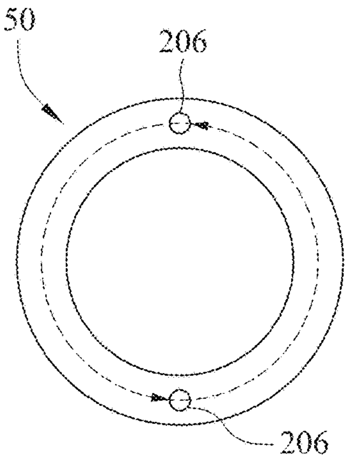
FIG. 14B shows an electron acceleration path in accordance with the example embodiment of FIG. 14A.

In a first Example shown in FIGS. 14A and 14B, a jet-and-plate setup 10 is provided with additional hardware, software or combination thereof and operable to adapt the setup to operate as a miniature plasma containment apparatus, accelerator, Radio Frequency (RF) generator 200 or combination thereof. Specifically, an electrical circuit in the form of a magnetic field generator or coil setup 202 is provided adjacent or near to the plate 32 and opposite a jet 20 or adjacent to the jet itself in some embodiments where the jet is inset or at least partially integrated with the plate 32. By "adjacent," what is meant is that it may be in contact or nearly in contact with its neighboring body. Although not shown, coil 202 can be positioned on the opposite side of the plate shown in FIG. 14A, with the jet passing therethrough. This can allow closer proximity of the coil setup to the toroidal plasma 50 it is intended to influence or control.

However configured, a magnetic field can be applied and optionally controlled by a computer hardware module 204 such that free electrons 206 in the corona 50, produced as described in embodiments above and others, rotate within the subject plasma as indicated in FIG. 14B. Steady or variable RF emission of nearly any desired, discrete frequency or frequencies can thereby be produced in addition to generation of corona light.

In system 200, toroidal containment and use of a plasma is achieved in an elegant manner. Namely, additional magnetic containment field equipment, such as the inclusion of toroidal magnetic field coils, found in a conventional Tokamak is not present, yet the desired and useful toroidal form factor is available, in a boundryless or uncontained format.

Figure 15A:
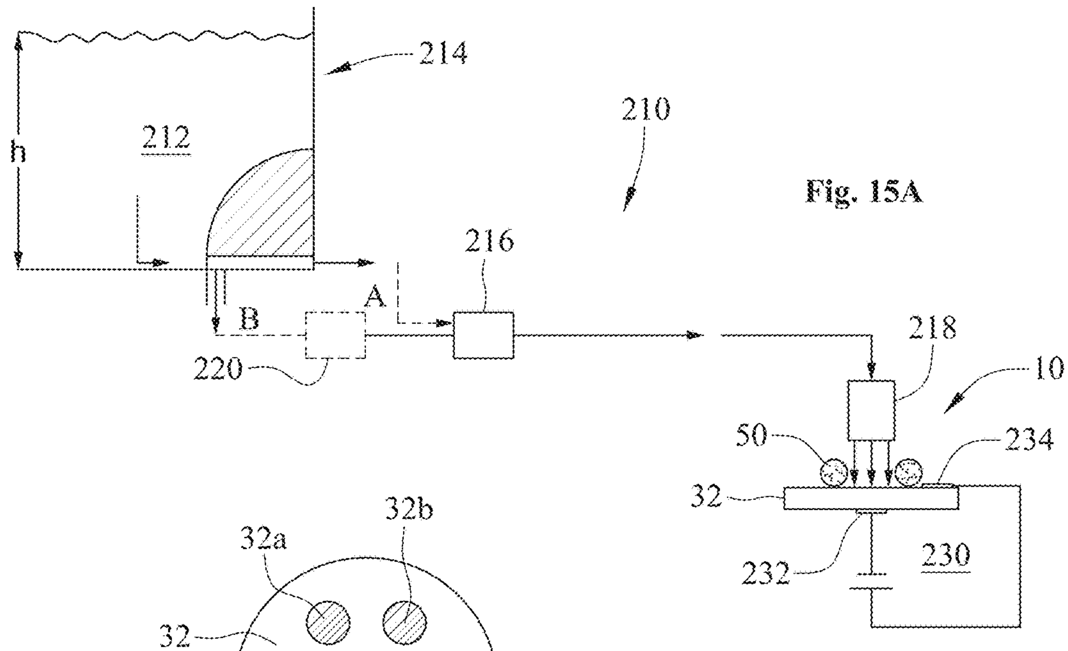
FIG. 15A is a side view diagram of a power generation system using a jet-and-plate setup according to an example embodiment.
Figure 15B:
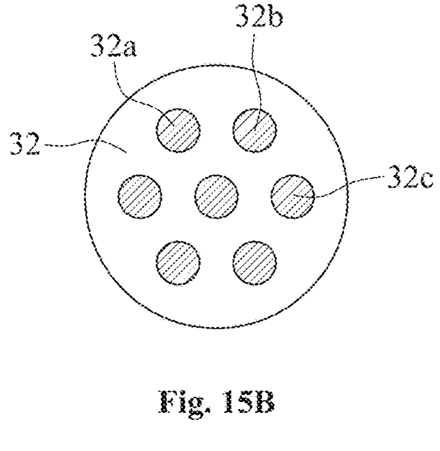
FIG. 15B is a top detail view of a target for a system according to the example embodiment of FIG. 15A.

In a second Example illustrated in FIGS. 15A and 15B, a setup 10 is provided with additional hardware to operate as a power generator 210 system. Specifically, water 212 within a reservoir 214 may be provided to drive a pump 216 to power a jet assembly 218. A pressure head indicated in relation to a height "h" of water behind a dam or within a tank or other feature 214, as semi-generically depicted, may provide some degree of pressure, in which case the pump will operate as a booster pump. Such a setup is indicated as using water flow paths "A" and "B" in FIG. 15A.

Alternatively, a pressure head may drive pump 216 alone, where pump 216 draws water from a separate tank (not shown) of specially treated water. Such a tank may be filled with distilled or filtered reservoir water.

In some embodiments, reservoir water may be filtered, distilled or otherwise treated by a module or station 220 in-line with the pump to achieve its desired di-ionized character (e.g., by nano-filtration or others) and resistance as above, or otherwise. In some embodiments, pump 216 may be omitted a setup with a reservoir functioning alone to supply the pressure head (h) and fluid supply for jet assembly 218.

In many embodiments, a system 210 can include one or more electrodes connected to an underside of a plate 32. In an electrical circuit 230, such electrodes can serve as an anode 232 which provides or donates electrons while a cathode 234 is provided by one or more electrodes at, along, adjacent or otherwise near the top side of plate 32 as shown. The electrical potential of the corona effect described herein can thereby be harvested.

The systems and methods herein will not only produce corona light, but electrical power as well. In some embodiments, a single nozzle and plate target surfaces are employed. In other embodiments, multiple jets emanate from a head or jet assembly 218 and are directed at multiple target plate areas as indicated by the arrows in FIG. 15B.

As illustrated in FIG. 15B, a plate 32 for such use may include multiple discs or otherwise-shaped inserts 32_a_, 32_b_, 32_c_, and so on, of nonconductive, dielectric material. The insert material may be selected may be highly piezo-electric and durable in nature. In some embodiments, examples include quartz, $LiNbO_3$, sapphire and others.

The target areas as defined by the inserts may be set apart to avoid interference between corona generation regions. A plurality of heads and, optionally, matching inserts may be employed to multiply or multiplex power generation with a maximum number limited only by available fluid or pressure supply.

Variations

In controlling systems as described above, general purpose or dedicated "firm ware" computer hardware may be used or otherwise adapted. Firmware will typically include non-transitory memory (in the form of a programmable hard drive, RAM, etc.) for the storage and execution of instructions contained therein or thereon.

The subject methods, including methods of use and/or manufacture of the hardware described, may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility that there are a plurality of the same items present. More specifically, as used herein and in the appended claims, the singular forms “a,” “an,” “said,” and “the” include plural referents unless specifically stated otherwise. In other words, use of the articles allow for “at least one” of the subject item in the description above as well as the claims below. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation.

Without the use of such exclusive terminology, the term “comprising” in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity. Accordingly, the breadth of the different inventive embodiments or aspects described herein is not to be limited to the examples provided and/or the subject specification, but rather only by the scope of the issued claim language.

The invention claimed is:

1. A method comprising:

in a system, directing a water jet through a nozzle at a plate, wherein the plate comprises an electrically non-conductive dielectric material and the water is distilled or deionized water to produce a corona light around the jet while maintaining a surface of the plate intact where the surface is impacted by the water jet; and producing and transmitting an energy output selected from electrical power and radio frequency radiation from the system in addition to the corona light, wherein the corona light and the energy output is produced, without an applied electrical field, by impact of the distilled or deionized water on the plate leading to an electrical charge on the surface of the plate through streaming potential.

2. The method of claim 1, wherein the energy output is electrical power transmitted by way of electrodes connected to the system.

3. The method of claim 1, wherein the energy output is radio frequency radiation produced by applying a magnetic field to rotate free electrons around a boundaryless or uncontained toroidal shape.

4. The method of claim 1, wherein a piezo-electric material is on a target area of the plate, wherein the energy output is in the form of a radio frequency radiation.

5. The method of claim 1, wherein a target area of the plate has a rough surface to enable generating the corona light at a water jet velocity of at least about 150 m/s.

6. The method of claim 1, wherein a gas is adjacent to the water jet and the plate.

7. The method of claim 6, wherein the gas is at atmospheric pressure.

8. The method of claim 7, wherein the gas is air.

9. The method of claim 6, wherein the gas is selected from $N_2$ and $O_2$.

10. The method of claim 6, wherein the gas is a noble gas selected from He, Ar and Ne.

11. The method of claim 4, wherein the piezo-electric material is in the form of at least one insert in the plate.

12. The method of claim 4, wherein the piezo-electric material is quartz or $LiNbO_3$.

13. The method of claim 1, wherein a plurality of water jets are directed at the plate.

14. The method of claim 13, wherein the plate includes a plurality of inserts positioned across from the water jets.

15. The method of claim 14, wherein the plurality of inserts each comprise a piezo-electric material.

16. The method of claim 15, wherein the piezo-electric material is selected from quartz and $LiNbO_3$.

17. The method of claim 1, wherein a plurality of water jets, each through a nozzle, are directed at the plate, and the method further comprises providing pressure for the plurality of water jets using a dammed reservoir.

18. The method of claim 17, wherein water from the dammed reservoir directly provides pressure to the plurality of water jets.

19. The method of claim 17, wherein water from the dammed reservoir drives a pump to power the plurality of water jets.

* * * * *